(12) United States Patent
Ueno

(10) Patent No.: US 6,659,485 B2
(45) Date of Patent: Dec. 9, 2003

(54) FOOTBOARD

(76) Inventor: Mamoru Ueno, Imazu 362, Kinosaki-cho, Kinosaki-gun, Hyogo-ken (JP)

( * ) Notice: Subject to any disclaimer, the term of this patent is extended or adjusted under 35 U.S.C. 154(b) by 0 days.

(21) Appl. No.: 10/072,945

(22) Filed: Feb. 12, 2002

(65) Prior Publication Data

US 2003/0042700 A1 Mar. 6, 2003

(30) Foreign Application Priority Data

Sep. 3, 2001 (JP) .................................... 2001-265723

(51) Int. Cl.$^7$ ................................................ B60R 3/02
(52) U.S. Cl. ........................ 280/166; 280/169; 182/98; 296/62
(58) Field of Search ................................. 280/166, 163, 280/164.1, 164.2, 165, 169; 182/91, 98; 296/62

(56) References Cited

U.S. PATENT DOCUMENTS

| | | | | | |
|---|---|---|---|---|---|
| 1,363,396 A | * | 12/1920 | Cross | ........................... | 182/88 |
| 1,487,408 A | * | 3/1924 | Tichy et al. | ................. | 280/166 |
| 3,515,406 A | * | 6/1970 | Endsley, Jr. | ................. | 280/166 |
| 3,645,557 A | * | 2/1972 | Aldropp et al. | ............. | 280/166 |
| 3,743,320 A | * | 7/1973 | Clark | ........................... | 280/166 |
| 3,756,622 A | * | 9/1973 | Pyle et al. | ................... | 280/166 |
| 3,771,815 A | * | 11/1973 | Bridges | ....................... | 280/166 |
| 3,817,554 A | * | 6/1974 | Cuffe et al. | ................. | 280/166 |
| 3,833,240 A | * | 9/1974 | Weiler | ......................... | 280/166 |
| 4,073,502 A | * | 2/1978 | Frank et al. | ................. | 280/166 |
| 4,110,673 A | * | 8/1978 | Magy et al. | ................. | 318/466 |
| 4,116,457 A | * | 9/1978 | Nerem et al. | ................ | 280/166 |
| 4,180,143 A | * | 12/1979 | Clugston | ...................... | 182/91 |
| 4,536,004 A | * | 8/1985 | Brynielsson et al. | ........ | 280/166 |
| 4,911,264 A | * | 3/1990 | McCafferty | ................... | 182/92 |
| 5,280,934 A | * | 1/1994 | Monte | ......................... | 280/166 |
| 6,082,751 A | * | 7/2000 | Hanes et al. | ................. | 280/163 |

* cited by examiner

Primary Examiner—Brian L. Johnson
Assistant Examiner—Bridget Avery
(74) Attorney, Agent, or Firm—Ronald E. Greigg

(57) ABSTRACT

A footboard which can be used in case of necessity by drawing out a footboard main body as a tread from a lower portion or a vicinity of the lower portion of a portion for getting on and off and then by lowering the footboard main body to an intermediate position of a height from a drawn out position to the ground below the footboard in order to make it extremely easy not only for general well-built adult men but also children, women, elderly people, people with leg or lumbar disabilities to get on and off a step portion and especially an automobile with a large vehicle height, called a van or a recreational vehicle, and having a door for getting on and off in a relatively high position. This is formed by assembling attachment members for attaching the footboard to the step portion, e.g., a floor face or a vicinity of the floor face of the portion for getting on and off of the automobile, left and right slide rails supported by the attachment members to advance and recede in a back-and-forth direction, left and right lifting/lowering stays formed by supporting through pins slide rails respectively mounted to the left and right slide rails, a footboard main body supported horizontally by the left and right lifting/lowering stays, and a mortise grip provided to the footboard main body for carrying out advancing/receding and lifting/lowering operations of the footboard main body in the back-and-forth direction.

10 Claims, 7 Drawing Sheets

(b)

FOOTBOARD

BACKGROUND OF THE INVENTION

1. Field of the Invention

The present invention relates to a footboard which is a tread for making it easy not only for general well-built adult men but also children, women, elderly people, people with leg or lumbar disabilities to get on and off when the person gets on and off a step portion of an automobile, a staircase of a house, a vestibule, or the like and the footboard can be used in case of necessity by drawing out a footboard main body as the tread from a lower portion or a vicinity of the lower portion of a portion for getting on and off and then by lowering the footboard main body to an intermediate position of a height from the drawn out position to the ground below the footboard.

2. Description of the Related Art

A step portion of an automobile, a staircase of a house, a vestibule, or the like and especially various automobiles and especially many automobiles such as vans and recreational vehicles generally have large vehicle heights. If the vehicle height is large, a floor face of a portion for getting on and off is naturally at a position which is high to some degree. There are models in which a floor face inside a portion for getting on and off of rear seats is formed as a lower step, but such a step formed by making the floor face lower is still high in many cases. There are models in which a floor height is at a midpoint position between a floor height of a general passenger car and a van among recent recreational vehicles and such models do not have the floor face inside the portion for getting on and off formed as the above-described lower step. Therefore, conventionally, it takes much time and it is dangerous to get on and off because it is difficult for children, women, elderly people, and people with leg or lumbar disabilities to get on and off without assistance of those around them.

Conventionally, in such a case at the step portion of the automobile, the staircase of the house, the vestibule, or the like, assistance from those around the person getting on and off is obtained as described above or a box for getting on and off is placed on the ground in front of the step portion and the person gets on and off by placing his/her feet on this box. There are models having side steps on the left and right of a vehicle body among jeep-type models among the automobiles.

However, even if assistance is obtained from those around the person in getting on and off the step portion of the automobile, the staircase of the house, the vestibule, or the like and especially the automobile, a great burden is imposed on the person who provides assistance if the person getting on and off is an adult. Especially when there is only a woman who can provide assistance, a burden on her is greater to aggravate danger in such a manner as to cause a backache, a hernia, a slipped disk, and the like.

The above-described method of placing the box in front of the step portion may be dangerous depending on a position of the box which the person steps on and how to step on the box, because the person may miss his/her footing on the box or the box may change orientation or may move to cause the person to fall down. Moreover, the box may become an obstacle when it is not used. Only a small percentage of the models of the automobiles have the above-described side steps. If such side steps are provided to many vans and recreational vehicles to project sideways, the side steps may injure people or scratch other cars in traveling.

Recently, there are automobiles having a step device which is actuated to advance and recede outward (frontward) from a floor face or below the floor face of a portion for getting on and off on a side of rear seats among the automobiles. However, this type of step device advances and recedes only outward (frontward) and a height of the device cannot be changed. Therefore, above-described difficulty in getting on and off cannot be solved.

The inventor of the present invention conventionally realized that it was difficult to get on and off the step portion of the automobile, the staircase of the house, the vestibule or the like and especially the automobile with the large vehicle height and began development of a novel footboard for the automobile which solves such a problem and which can be easily retrofitted to the automobile. As a result of subsequent earnest study, the inventor of the present invention finally invented the footboard for the step portion as the present invention and completed a prototype.

SUMMARY OF THE INVENTION

It is an object of the present invention completed after the above experiences to provide a footboard. In a case of a step portion of an automobile, a staircase of a house, a vestibule, or the like and especially when a floor face of a portion for getting on and off in a commercially available model having a large vehicle height and called a van or a recreational vehicle is higher than that of a normal passenger car, the footboard is easily mounted to the floor face or a vicinity of the floor face by using bolts and the like. In getting on and off, by only holding a footboard main body with a hand, drawing it out frontward, and pushing it down, it is possible to horizontally position the footboard main body at a height which is about a half of a height from a front portion of the portion for getting on and off to the ground to thereby make it easy for a person to get on the vehicle by placing his/her feet on the footboard main body. Especially, the footboard makes it easy for children, women, elderly people, and people with leg or lumbar disabilities to get on and off by themselves and makes it easy to assist them when there is a person who provides assistance. When the footboard is not used, it is possible to easily accommodate the footboard main body by folding the footboard main body with a hand such that the footboard main body is disposed along the floor face inside the portion for getting on and off or a bottom of a body so as not to become an obstacle. Because main portions of the footboard can be produced by using commercially available members and a structure is simple and excellent in a load-carrying property and durability, the footboard can be used for a long term without anxiety.

To achieve the above objects, there is proposed a footboard according to the invention for making it easy for a person to get on and off a step portion and including: an attachment member for attaching the footboard to a floor face or a vicinity of the floor face of a portion for getting on and off of the step portion; left and right advancing/receding members supported by the attachment member to advance and recede in a back-and-forth direction; left and right lifting/lowering stays respectively mounted to the left and right advancing/receding members; a footboard main body supported horizontally or substantially horizontally by the left and right lifting/lowering stays; and an operating member provided to the footboard main body and formed of a grip or a handle with which advancing/receding and lifting/lowering operations are carried out.

If the footboard of the invention having the above structure (hereafter abbreviated as the footboard of the invention)

is mounted to the step portion of the automobile, the staircase of the house, the vestibule, or the like and especially to the floor face of the portion for getting on and off of a van with a large vehicle height or a recreational vehicle with a relatively large vehicle height, by only holding the footboard main body which is a tread of the footboard, drawing it out frontward, and then pushing it down in getting on and off, it is possible to form a step in a position at a height which is about a half of a floor height and which is such a height that a foot just in front of the portion for getting on and off can be easily placed on.

As a result, not only well-built adult men but also children, women, elderly people, and people with leg or lumbar disabilities can easily get and on off by using the footboard main body as the tread.

When the footboard of the invention is mounted to the floor face (floor plate) of the step portion of the automobile, the staircase of the house, the vestibule, or the like (hereafter merely referred to as the step portion), the floor face is sandwiched between the attachment member and a reinforcing plate (metal plate) and mounting the footboard by using mounting means such as bolts, nuts, and the like. This structure is preferable because the floor plate is not broken or deformed.

In other words, in the footboard of the invention, the footboard is placed on the floor plate inside the portion for getting on and off of the step portion, bolt holes are formed in the floor plate, the bolts are inserted through the attachment member and the floor plate, and the footboard is fasten with the nuts. Thus, the entire footboard is reliably fixed onto the floor plate. If the reinforcing plate (metal plate) is positioned on a back side of the floor plate to sandwich the floor plate in this mounting, the floor plate is not broken or deformed.

There is not a special limitation to a concrete structure used for each the advancing/receding member, but one formed of a slide rail, a cylindrical one such as a cylinder and a piston, or one formed of an outer tube portion having a polygonal or circular cross section and an advancing/receding portion for advancing and receding from and into the outer tube member may be employed, for example. In the third one, the advancing/receding portion may be in a shape of a tube or a rod. As far as the advancing/receding member is one which can be expanded and contracted in the back-and-forth direction to stably move the footboard main body forward and rearward including the above structures, there is not a special limitation to the member.

There is not a special limitation to a structure of each the lifting/lowering stay as far as lifting/lowering can be carried out easily with one hand and the footboard main body can be reliably maintained in the horizontal or substantially horizontal state in lowering.

Furthermore, there is not a special limitation to a structure of the operating member as far as the member does not become an obstacle to getting on and off. To put it concretely, the operating member may be a grip or a handle provided to a lateral central portion in a front face portion of the footboard, for example, or a mortise grip fixed into a hole formed in a substantially central face of the footboard is the most suitable because operation of moving forward and rearward and lifting and lowering can be carried out extremely easily.

In the footboard of the invention, it is preferable that the left and right advancing/receding members for advancing/receding in the back-and-forth direction are formed of left and right pairs of slide rails for the following reasons.

In other words, if the advancing/receding members are formed of the slide rails, because the commercially available slide rails can be used, it is possible to reduce a manufacturing cost. When the slide rails are drawn out frontward, the drawn out portions of the slide rails can bear considerable pressure from above. Therefore, the slide rail can be said to be safe, durable, and the most suitable material. Therefore, it is possible to employ a forming method in which the lifting/lowering stays are mounted for pivoting to the drawn out portions of the slide rails and the footboard main body is mounted for pivoting between the lifting/lowering stays.

When the commercially available slide rails are used as the advancing/receding members, if elongated holes are formed in inners of inner slide rails and end portions of the lifting/lowering stays are supported in the elongated holes through pins, effort and time are required for drilling and assembly and hindrance to forward and rearward movements of the inners and movements of the lifting and lowering stays is liable to be caused. Therefore, an intermediate member which is formed of a long plate made of metal, narrow, and extending to be long in a back-and-forth direction and which is formed with elongated holes extending from positions close to front and rear ends of the plate to approach each other is mounted to each the lifting/lowering stay and a corresponding end of the lifting/lowering stay is supported in each the elongated hole of the intermediate member through a pin.

In the footboard of the invention, it is preferable that each of the left two and right two lifting/lowering stays in the left and right lifting/lowering stays is formed of a slide rail.

Thus, if each the component member of the lifting/lowering member is formed of the slide rail, a distance by which the stay is vertically expanded and contracted can be increased by the component member itself. Therefore, it is possible to lower the footboard main body to a desired height. Because the respective stays are expanded and contracted in the lifting and lowering, it is possible to horizontally support the footboard main body in a stable attitude without moving a back-and-forth space between upper ends of the respective stays.

In the footboard of the invention, there is not a special limitation as far as the left and right lifting/lowering stays respectively mounted to the left and right advancing/receding members can be folded in the vertical direction and do not project upward by long distances when folded upward. However, each of the left and right lifting/lowering stays is preferably one formed of a link body formed by crossing two stays in an X shape in a side view and fixing a portion of intersection for pivoting by a pin.

If the left and right lifting/lowering stays are positioned between left and right side walls of the footboard main body and the both are connected as described above, left and right two ends of the left and right lifting/lowering stays supported on the footboard main body move upward or downward to lift or lower the footboard main body when an upward or downward force is applied to the footboard main body. At this time, upper and lower stop positions of lifting and lowering are set such that footboard main body is horizontal or substantially horizontal and that stability is not lost.

If the left and right lifting/lowering stays are fixed for pivoting through the pins in the X shape in the side view, upward and downward expansion and contraction of the footboard main body can be carried out in a stable attitude and a horizontal attitude and it is possible to easily fold the footboard main body in collapsing in an extremely compact state.

Moreover, in the footboard of the invention, it is preferable that the attachment member for attaching the footboard to the floor face or a vicinity of the floor face of the portion for getting on and off of the step portion also functions as a cover in which the left and right advancing/receding members and the left and right lifting/lowering stays are accommodated when the footboard main body is in an accommodated state.

With the above structure, if the footboard of the invention is not used, the advancing/receding members and the lifting/lowering stays positioned on the left and right are accommodated in the attachment member. In this accommodated state, a back-and-forth width of the footboard main body and a back-and-forth length of the attachment member are substantially the same and the main body and the member are substantially flush with each other. In other words, because the entire footboard is positioned in a flat state inside the portion for getting on and off of the step portion, it is possible to keep the footboard out of the way of the feet when the person gets on and off, to ensure safety of the person getting on and off, and to prevent defilement of the beauty of the step portion and a periphery of the step portion. A person who can get on and off without drawing out the footboard main body can get on and off by placing his/her feet on the footboard main body collapsed on a floor of the step portion.

As a result, in order to use the footboard of the invention, if a force for pulling the footboard main body at the step portion frontward is applied with a hand, the left and right inner advancing/receding members are drawn out frontward by a little over half in synchronization with the footboard main body. With this structure, it is possible to draw the entire footboard main body out of the vehicle while horizontally supporting the main body on the left two and right two slide rails, for example.

If a force for pushing the footboard main body downward is further applied from this state, the entire footboard main body moves down to the position at the height which is about a half of the height of the floor plate of the step portion and stops in that position in the horizontal and stable attitude. The person getting on and off the step portion can get on and off by placing his/her feet on the footboard main body.

If the footboard main body is supported on the slide rails as described above, because the drawn out portions of the slide rails are highly resistant to a load from above, the footboard is strong because of the slide rails even if a load of about a weight of a person is applied.

In the footboard of the invention, it is possible to vertically lift and lower the footboard main body while maintaining the horizontal attitude of the footboard main body. It is also possible to easily fold in collapsing and to fold the lifting/lowering stays substantially flat to prevent the stays from becoming obstacles to feet.

The footboard of the invention can be used while being mounted to any portion if the portion is the step portion which needs to be made easy for not only the well-built adult men but also children, women, elderly people, and people with leg or lumbar disabilities to get on and off. To put it concretely, it is the most desirable that the footboard is used while being mounted to the step portion of the automobile, the staircase of the house, the vestibule, or the like and especially the portion for getting on and off of the automobile in terms of a frequency of use, effectiveness, convenience, and the like.

There is not a special limitation to material of the footboard of the invention as far as the material can be used satisfactory as the footboard. To put it concretely, the material may be metal such as iron, aluminum, stainless steel, and the like, an alloy, synthetic resin, FRP, or a combination of them.

DETAILED DESCRIPTION OF A PREFERRED EMBODIMENT

The object and structure of the present invention are as described above and next, a concrete embodiment of a footboard according to the invention will be described in detail by way of an example shown in the accompanying drawings.

In the following description and especially in the present embodiment, the example of the footboard used while being mounted to a portion for getting on and off of an automobile will be described.

Figure 1:
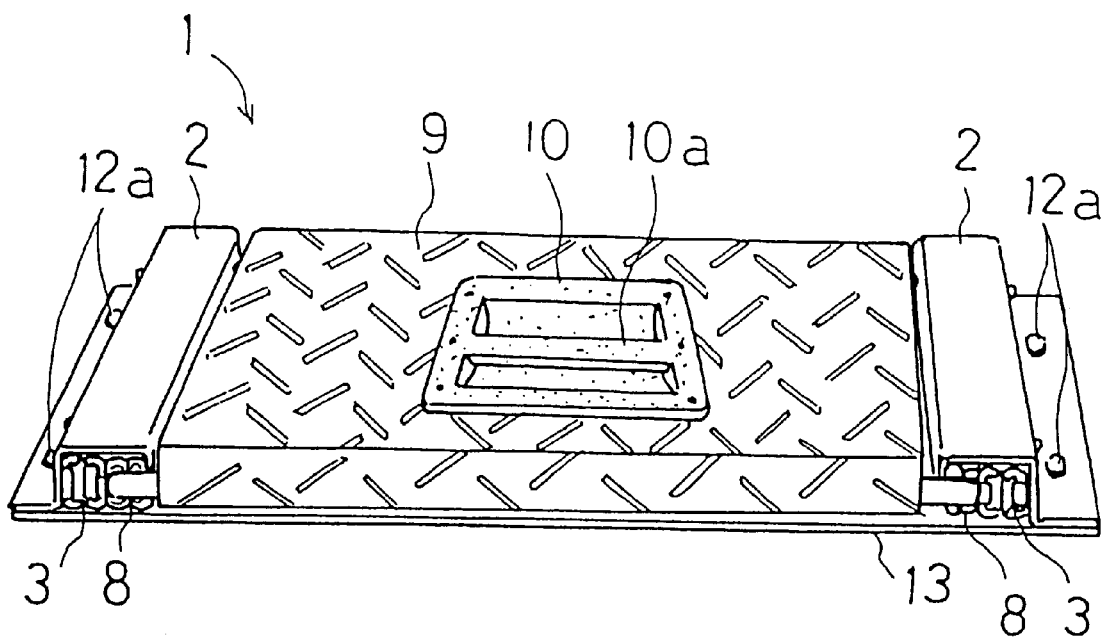
FIG. 1 is a perspective view of a collapsed state of a footboard of an automobile according to an embodiment of the present invention.
Figure 2:
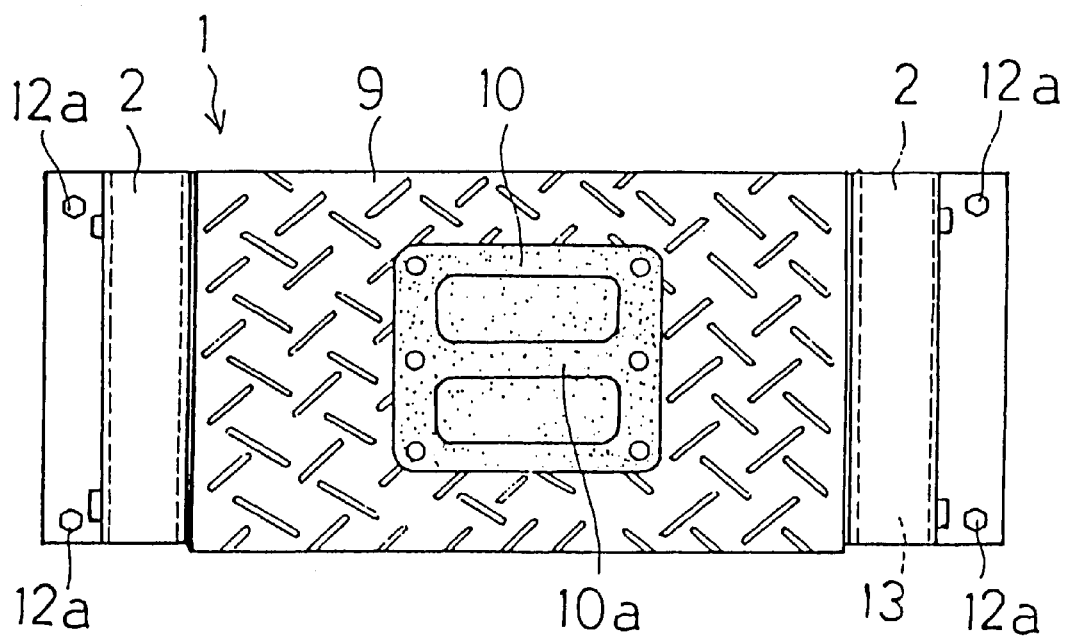
FIG. 2 is a plan view of the footboard in FIG. 1.
Figure 3:
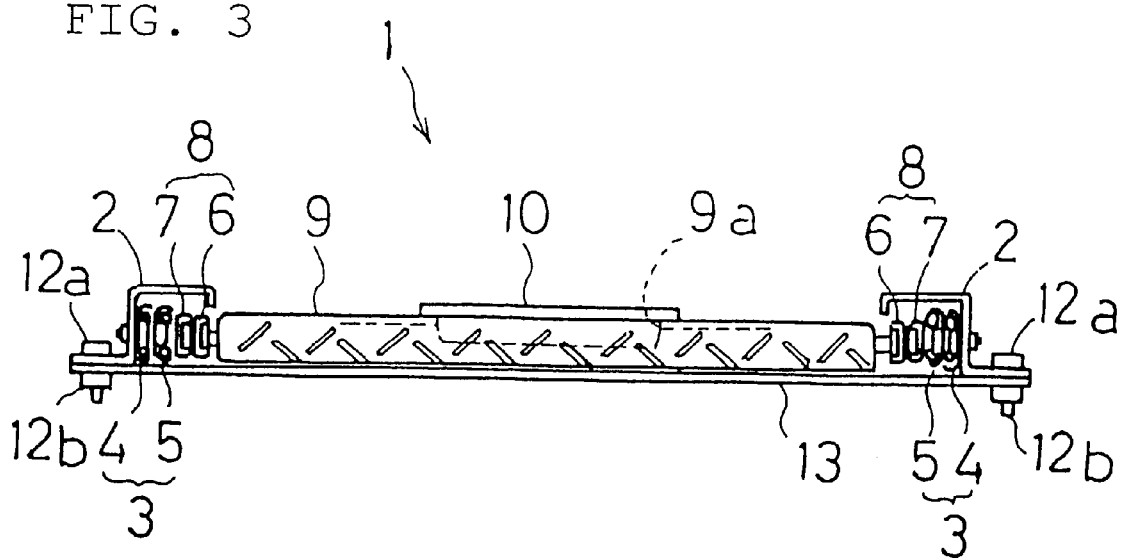
FIG. 3 is a front view of the footboard in FIG. 1.
Figure 4:
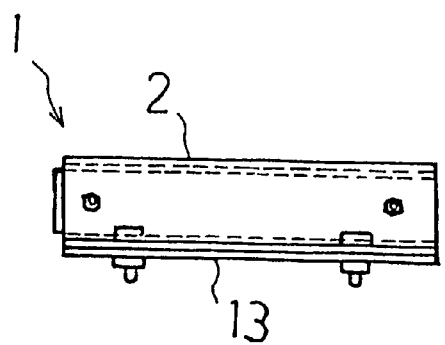
FIG. 4 is a right side view of the footboard in FIG. 1.

FIG. 1 is a perspective view showing a state in which a footboard made of stainless steel according to an embodiment of the invention (hereafter abbreviated as the footboard of the embodiment) is collapsed. FIG. 2 is a plan view, FIG. 3 is a front view, and FIG. 4 is a right side view of the footboard in FIG. 1.

As shown in these respective drawings, the footboard 1 of the embodiment is formed by assembling left and right attachment members 2, 2 for attaching the footboard to a floor face of the portion for getting on and off of the automobile, a footboard main body 9 used as a tread on which a person puts his/her feet to get on and off, advancing/receding members 3, 3 which are positioned between the attachment members 2, 2 and left and right side walls of the footboard main body 9 and on which the footboard main body is drawn out frontward and supported, left and right lifting/lowering stays 8, 8 for lowering the footboard main body 9 which has been drawn out frontward and maintaining a horizontal state of the footboard main body 9, and an operating member 10 for making it easy to draw out the footboard main body 9 frontward or push back, push down, or lift the footboard main body 9 while holding the footboard main body 9 with a hand.

More specifically, the attachment members 2, 2 are in bilaterally symmetrical shapes and are formed by respectively bending outward (in opposite directions) lower ends of side walls (standing portions) formed to be long in a back-and-forth direction through 90° to thereby form placing faces, bending upper ends of the side walls inward (in such directions to face each other) through 90° to thereby form cover upper faces, and bending end portions of the cover upper faces slightly downward.

Used as the above footboard main body 9 is one formed by slightly bending downward a periphery of a strong plate which is made of stainless steel and has an area sufficient to impart a function as a footboard (tread) used in getting on and off the automobile and suitable to be handled and accommodated. Although it is not shown in the drawings, it is preferable to prevent a slip of a foot of a person getting on and off by forming a large number of projecting portions with small heights or fixing a large number of pieces of thin rubber material onto an upper face of the footboard main body 9.

The advancing/receding members 3, 3 are bilaterally symmetrical and each the member is formed by positioning two slide rails 4 and 5 having substantially the same shapes as a back-and-forth width of the footboard main body 9 and a back-and-forth length of the attachment member 2 in the back-and-forth direction. Structures of the slide rails 4 and 5 will be described later in detail.

The lifting/lowering stays 3, 3 are bilaterally symmetrical. Used as each of the left and right stays are two slide rails 6 and 7 (6 and 7) having the same shapes as each other and having slightly smaller lengths than the back-and-forth width of the footboard main body 9 when the stays are contracted. These rails are crossed in an X shape in a side view and are connected for rotation at a point of intersection by a pin. Structures of the slide rails 6 and 7 will be described later in detail.

As the operating member 10, a commercially available mortise grip is used in the embodiment. In this mortise grip, a low step portion sunk deep is formed at a portion surrounded by a flange face and a grip portion 10a having the same height as the flange face is formed in a lateral direction at a center of the low step portion. The operating portion 10 is attached by using bolts and nuts after sinking the low step portion into an opening formed at a substantially central portion of the upper face of the footboard main body 9 and fitting the flange face onto the upper face of the footboard main body 9.

Next, specific structures of the respective members and a structure assembled from the respective members will be described based on FIGS. 1 to 7.

Figure 5:
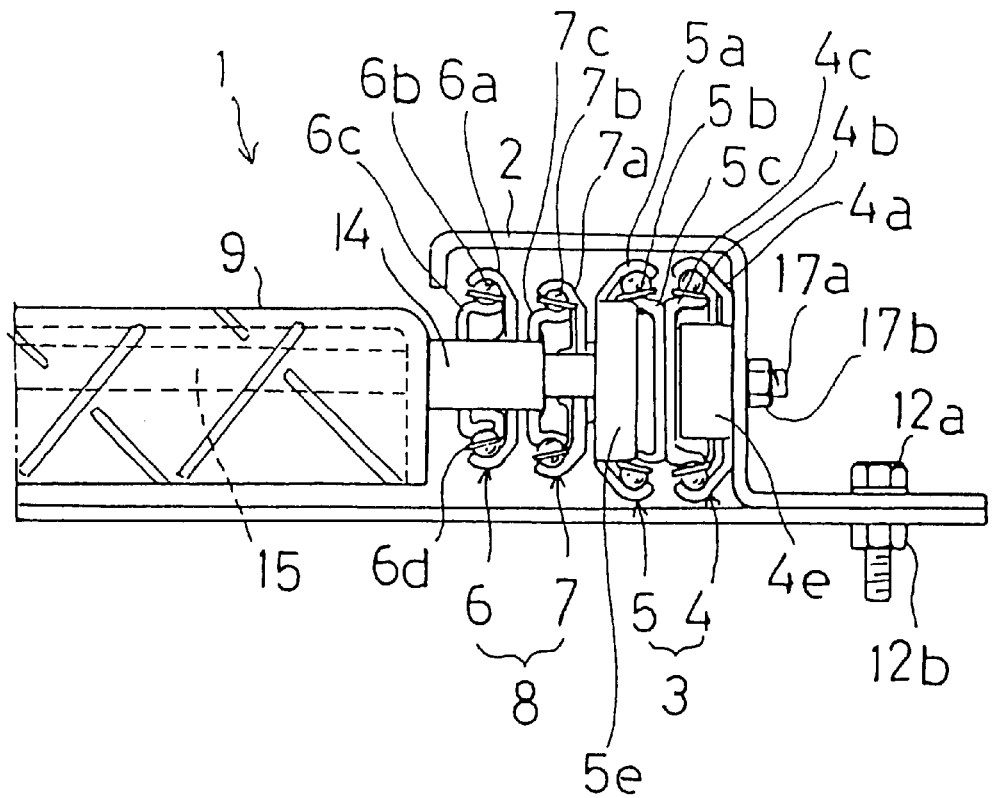
FIG. 5 is a front view of a structure of a right support portion when a footboard main body of the embodiment is in an accommodated position.
Figure 6:
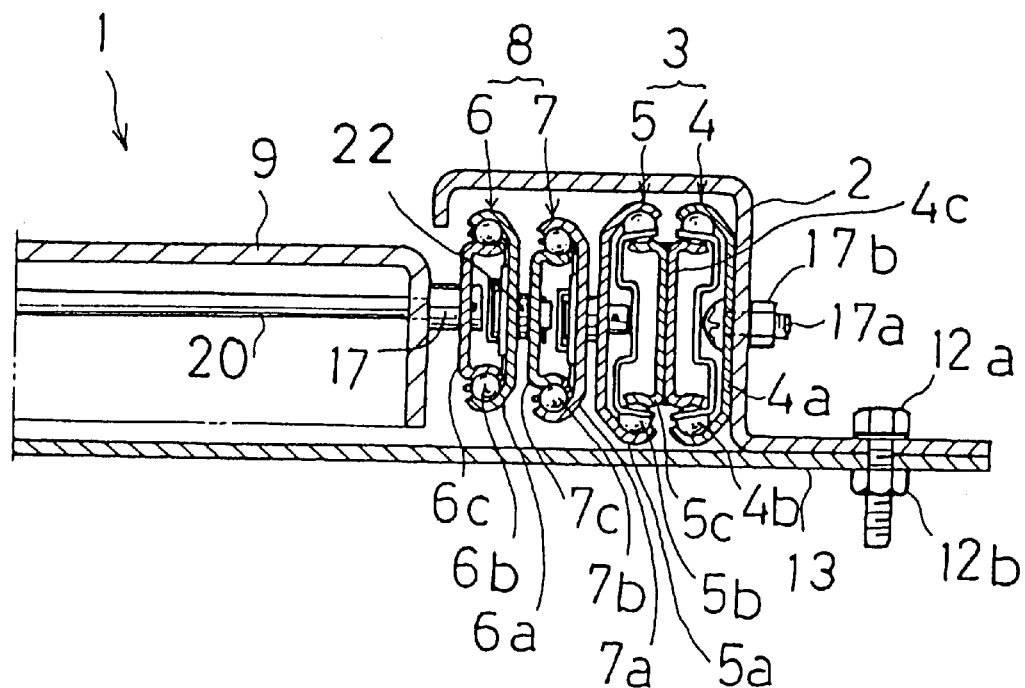
FIG. 6 is a sectional view of a rear portion of the structure in FIG. 5.
Figure 7:
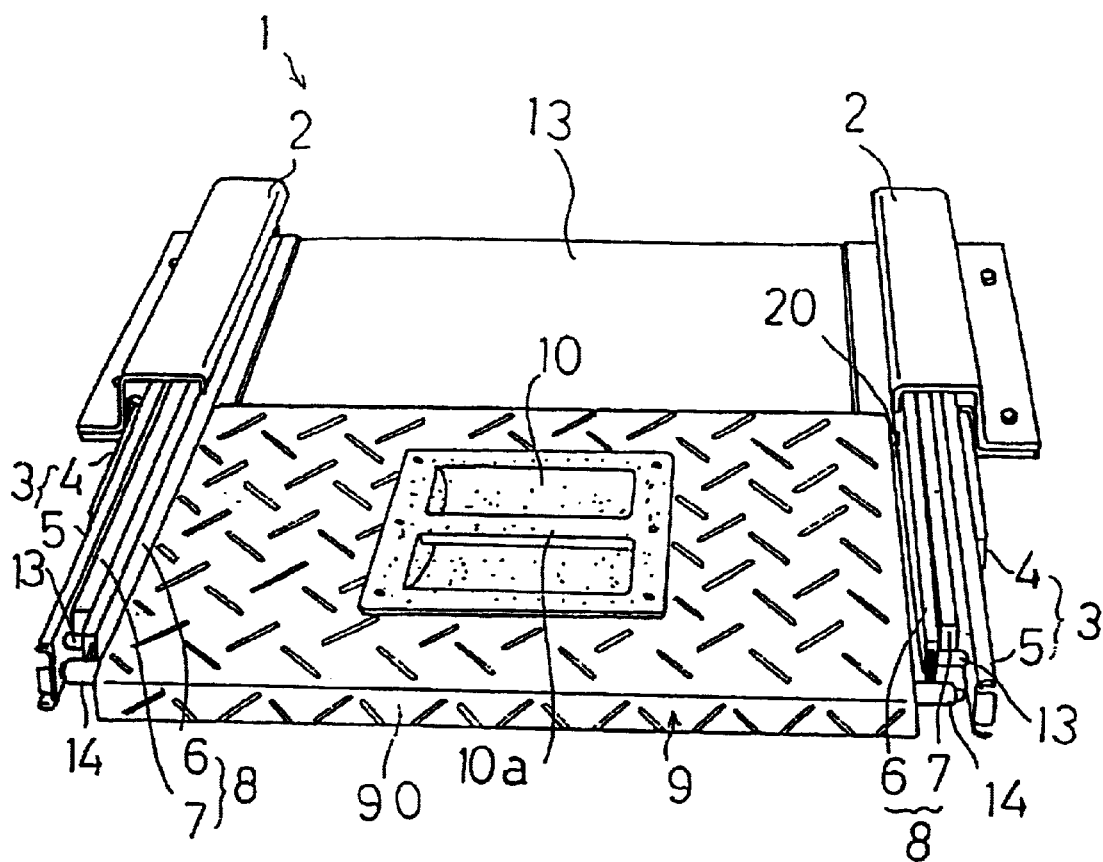
FIG. 7 is a perspective view of a state in which the footboard main body of the embodiment is drawn out.

FIG. 5 is a front view of a structure of a support portion on a right side of the footboard main body 9 when the footboard main body 9 is in an accommodated position. FIG. 6 is a sectional view of a rear portion of the support portion in FIG. 5. FIG. 7 is a perspective view showing a state in which the footboard main body is drawn out.

Description will be given by reference to FIGS. 1 to 4 and based on FIGS. 5 to 7.

The advancing/receding members 3, 3 are formed of left two and right two slide rails 4, 5 (4, 5) having the same shapes.

In these left and right slide rails 4, 5 (4, 5), the slide rails positioned close to the footboard main body 9 are referred to as inner slide rails 5 (5) and the slide rails positioned on opposite sides to the inner slide rails are referred to as outer slide rails 4 (4).

In the following description, only one of the reference numerals of the bilaterally symmetrical members will be described so as to avoid repetition of description.

The outer slide rail 4 is formed by assembling an outer 4a, an inner 4c, and ball bearings 4b . . . .

The outer 4a is formed of one which is long in the back-and-forth direction, made of metal, and formed by bending upper and lower ends of a side wall formed to be long in the back-and-forth direction such that the upper and lower ends are rounded in such directions as to face each other and by causing respective bent ends to slightly project in such directions as to face each other.

The inner 4c is made of stainless steel plate material which has such a size as to be fitted in the outer 4a and to advance and recede in the back-and-forth direction, is long in the back-and-forth direction, and has a substantially angular U shape in a front view. In order to insert and support the inner 4c for advancing and receding, a large number of ball bearings 4b . . . in contact with inner sides of upper and lower rounded portions of the outer 4a are supported in a position along the back-and-forth direction of an upper portion of the inner 4c. The inner 4c is fitted in the outer 4a for advancing and receding in a longitudinal direction and a stopper 4e is provided to a front end of the outer 4a such that the inner 4c can be drawn out by a little over half in the longitudinal direction and cannot be drawn out further.

The inner slide rail 5 has the same shape and structure as the outer slide rail 4. In FIGS. 5 and 6, a reference numeral 5a designates an outer, 5b a ball bearing, 5c an inner, and 5e a stopper.

Side walls of the inners 4c and 5c of the outer slide rail 4 and the inner slide rail 5 having the above-described structures are brought into contact with each other with orientations aligned with each other in the longitudinal direction and the faces brought into contact with each other are secured to each other by welding.

In order to prevent both the outers 4a and 5a from coming in contact with each other in this state, the side walls of the inners 4c and 5c project slightly from a space at side portions of the outers 4a and 5a. The entire inner slide rail 5 is disposed in a slightly higher position than a lower face of the attachment member 2 such that the slide rail 5 does not come in contact with a floor plate of the automobile when the slide rail 5 advances and recedes.

The lifting/lowering stay 8 is disposed between the outer 5a of the inner slide rail 5 forming the advancing/receding member 3 and the side wall of the footboard main body 9 such that the footboard main body 9 can be lowered in parallel to a height which is about a half of a floor height of the automobile downward from a space between the left and right advancing/receding members 3, 3 and can be maintained in a stable attitude in the position.

Each the lifting/lowering stay 8 is formed to have an X shape which can be deformed in a vertical direction in a side view by crossing the inner slide rail 6 and the outer slide rail 7 and fixing the point of intersection for pivoting by a pin.

These slide rails 6 and 7 are formed of ones made of metal and having substantially the same structures as the slide rails 4 and 5 forming the above-described advancing/receding members 3 and commercially available products in shapes slightly smaller than the slide rails 4 and 5 are used as the slide rails 6 and 7.

The structures are shown in FIGS. 5 and 6. In the inner slide rail 6, an inner 6c and a large number of ball bearings 6b . . . are inserted into and supported in an outer 6a such that the inner 6c can be drawn out of the outer 6a by a large distance.

Similarly, in the outer slide rail 7, an inner 7c and a large number of ball bearings 7b are inserted into an outer 7a such that the inner 7c can be drawn out of the outer 7a by a large distance.

Both the inners 6c and 7c faces the footboard main body 9 and a portion in a vicinity of an end positioned on a side of the inner 7c which is not drawn out of the outer 7a in the outer slide rail 7 and a portion in a vicinity of an end positioned on a side of the outer 6a on which the inner 6c is drawn out in the inner slide rail 6 are connected to each other for pivoting by a pin to thereby integrally mount the slide rails and 7 to each other.

Then, a portion in a vicinity of an end of the outer 6a on which the inner 6c is not drawn out is supported through a pin on a portion in a vicinity of a front end of the inner slide rail 5 forming the advancing/receding member 3 and a portion in a vicinity of an end of the outer 7a on which the inner 7c is not drawn out is supported through a pin on a portion in a vicinity of a rear end of the inner slide rail 5 forming the advancing/receding member 3 to thereby support the lifting/lowering stay 8 on the advancing/receding member 3 such that points of intersection which are positions of support through the pins can move by advancing/receding of the inner 7c.

Moreover, a tip end of each the inner 6c is mounted for pivoting to a projecting end of a front support shaft 15 supported on left and right edge walls in a vicinity of a front portion on a lower side of the footboard main body 9. A tip end of each the inner 7c is mounted for pivoting to a projecting end of a rear support shaft 20 supported on left and right edge walls in a vicinity of a rear portion on the lower side of the footboard main body 9.

As a result of the above-described assembly, the footboard main body 9 which has been drawn out forward can be moved downward from the space between the left and right advancing/receding members 3, 3 in a range in which rotation, advancing, and receding of the lifting/lowering stays 8, 8 are allowed while maintaining a parallel attitude of the footboard main body 9. At this time, as described above, because the points of intersection of the lifting/lowering stays 8 move as the inners 7 of the slide rails 7 expand and contract, it is possible to fold the lifting/lowering stays 8 flat. Although it is not shown in the drawings, measures against coming off of the inners 6c and 7c are also taken in the slide rails 6 and 7.

Figure 8:
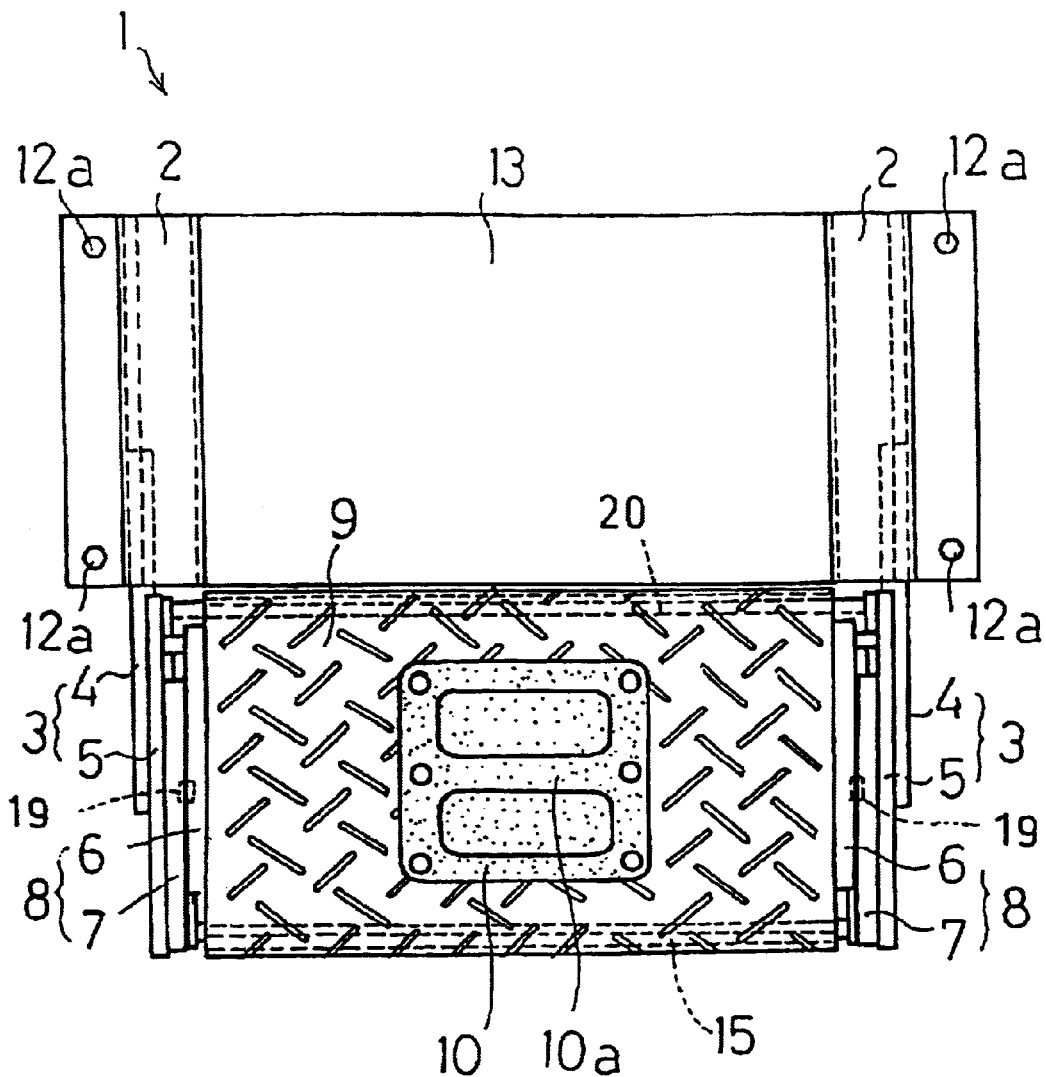
FIG. 8 is a plan view of the state in FIG. 7.
Figure 9:
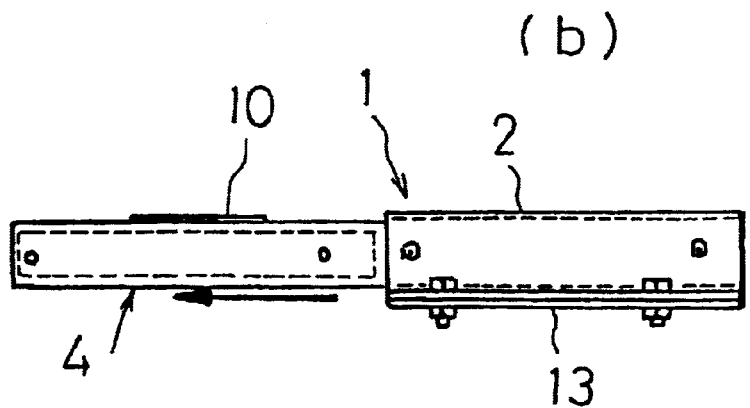
FIG. 9 is a front view of the state in FIG. 7.
Figure 10:
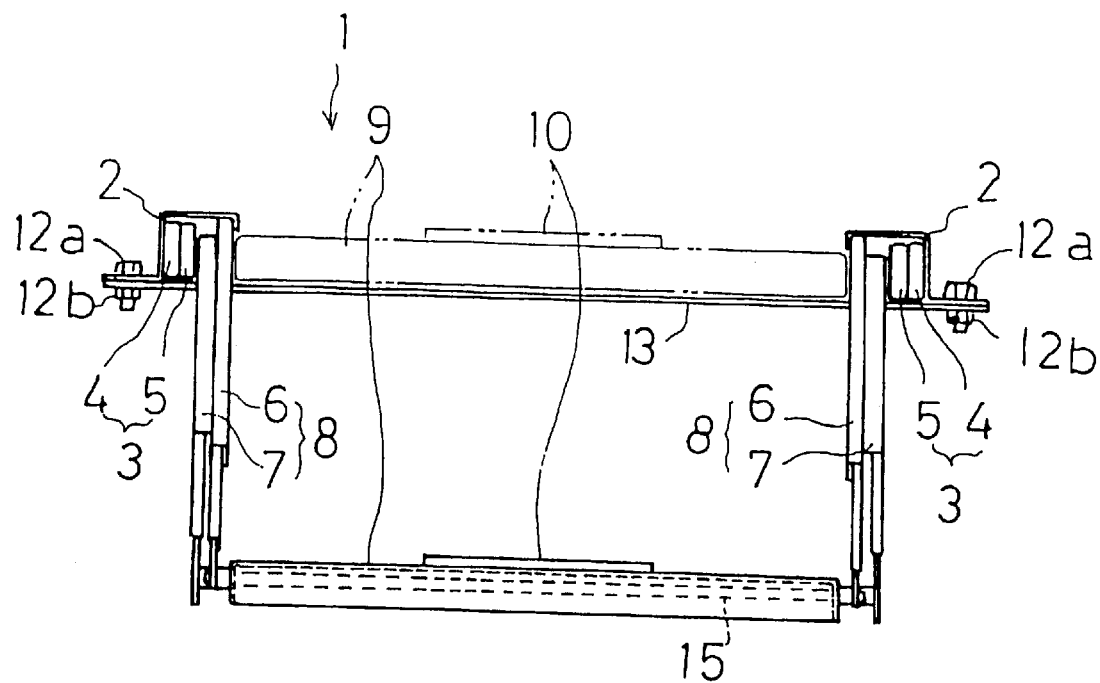
FIG. 10 is a right side view of the state in FIG. 7.
Figure 11:
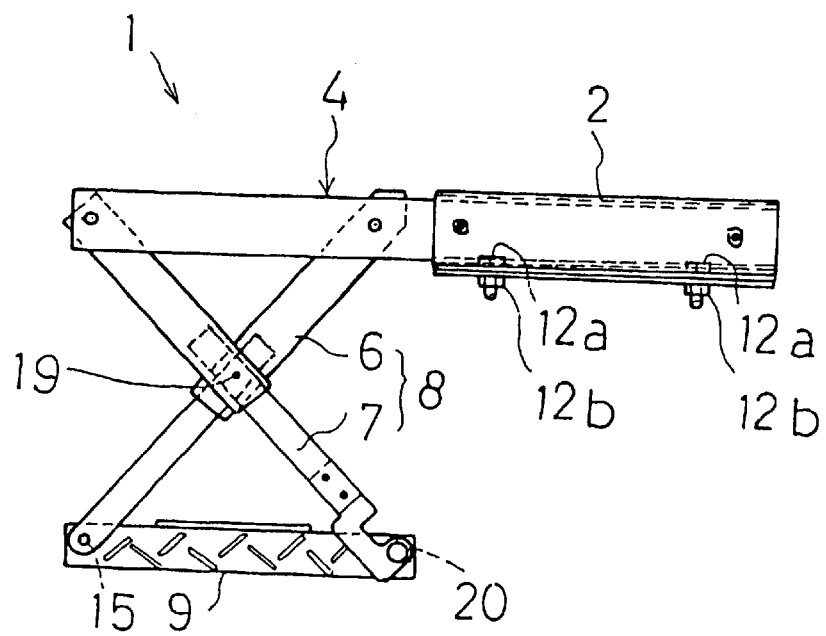
FIG. 11 is a side view of a state in which the footboard of the embodiment is lowered.

As a result of the above structure, if the grip portion 10a of the mortise grip 10 on the upper face at the center of the footboard main body 9 is held with a hand and pulled frontward, the slide rails 4 and 5 are drawn out frontward as shown in FIGS. 7 to 9. If the mortise grip 10 is further pushed downward while being held with the hand, the lifting/lowering stays 8, 8 extend downward to lower the footboard main body 9 in a parallel state as shown in FIGS. 10 and 11.

If the respective members of the lifting/lowering stays 8, 8 are formed of the slide rails 6, 7, 6, 7 and lifting and lowering are carried out without moving pivoting positions of the upper and lower ends, stability of the footboard main body 9 is improved.

In FIG. 7, a reference numeral 90 designates a front face portion of the footboard main body 9.

Figure 12:
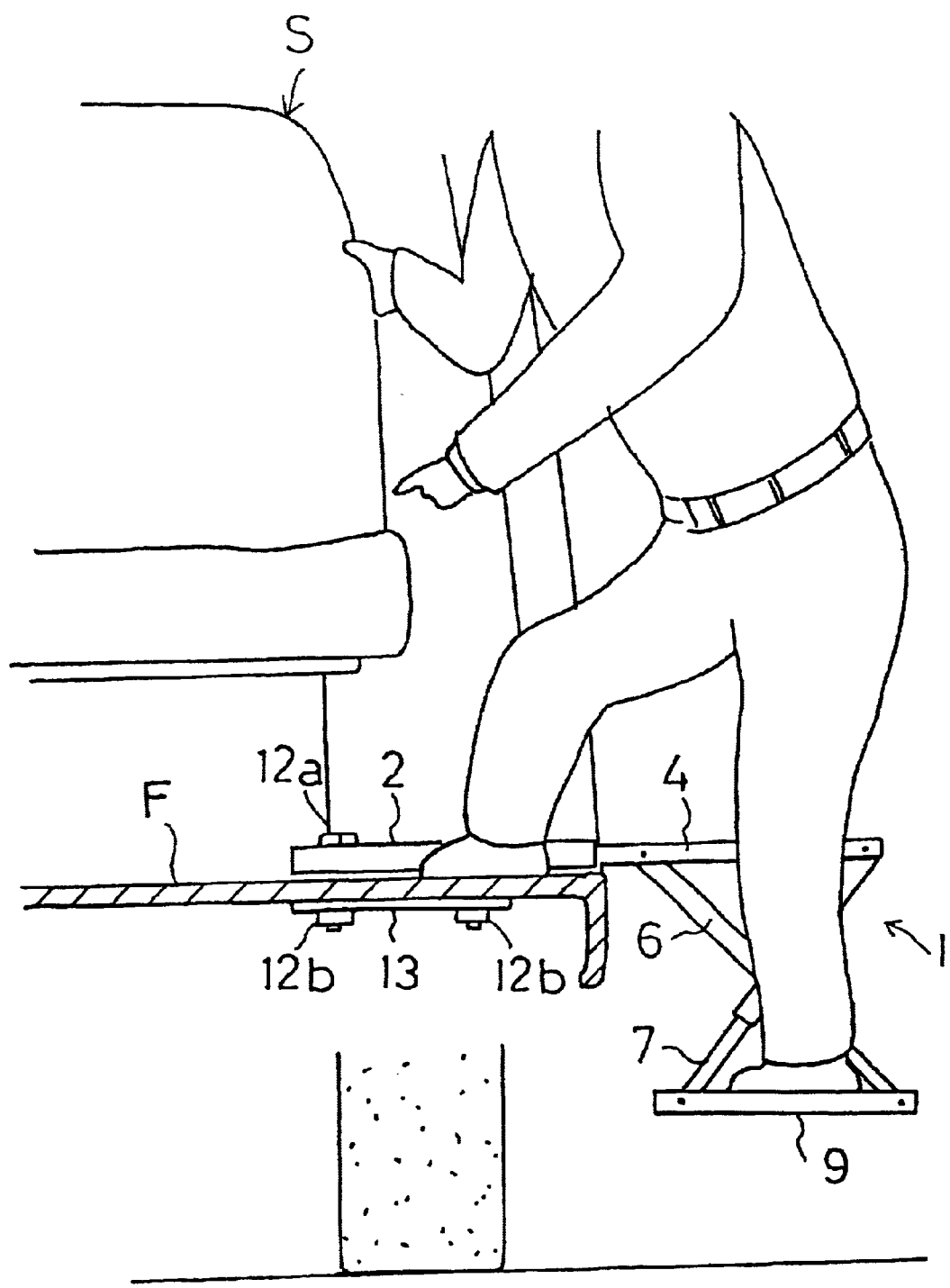
FIG. 12 is a drawing showing a state of use of the footboard of the embodiment.

FIG. 12 shows a state of use of the footboard 1 of the embodiment. The footboard 1 of the embodiment is mounted by positioning the left and right attachment members 2, 2 on the floor face F inside a rear door for getting on and off of a automobile with a large vehicle height and called a van or a recreational vehicle, positioning a bottom plate 13 on a lower face side of the floor face F, and fastening the bottom plate 13 by using bolts 12a and nuts 12b while sandwiching the floor face F.

If the footboard main body 9 is drawn out frontward and moved downward, a tread for getting on and off is formed in a position at a height which is about a half of the vehicle height. By using the tread to get on and off the automobile, it is possible to get on and off easily.

Although a case in which the footboard of the invention is applied to a step portion of the portion for getting on and off of the automobile has been described in the above embodiment, the footboard of the invention is not limited to this case and may be used while being mounted to a step portion of a staircase of a house or a vestibule, for example.

According to the footboard of the above-described invention, by only holding the footboard main body which is a tread of the footboard with a hand, drawing it out frontward, and then pushing it down when a person gets on and off the step portion, it is possible to horizontally position the footboard main body in a space at the height which is about a half of the floor height and which is such a height that a foot just in front of the portion for getting on and off can be easily placed on. As a result, not only well-built adult men but also children, women, elderly people, and people with leg or lumbar disabilities can extremely easily get on and off the step portion while using this footboard main body as the tread.

In the footboard of the invention, if the commercially available slide rails are used respectively as the left and right advancing/receding members which can advance and recede in the back-and-forth direction, it is possible to improve a load-carrying property and durability. Moreover, operation is extremely easily and it is possible to substantially reduce a cost of a product.

In the footboard of the invention, if each of the left and right lifting/lowering stays respectively mounted to the left and right advancing/receding members is formed of a link body formed by crossing the two stays in the X shape in a side view and fixing the portion of intersection for pivoting by the pin, upward and downward expansion and contraction of the footboard main body can be carried out in a stable attitude and a horizontal attitude and it is possible to easily fold the footboard main body in collapsing in an extremely compact state.

In the footboard of the invention, if the left two and right two stays are respectively formed of the slide rails, a distance by which the stays are expanded and contracted can be increased by the component members themselves. Therefore, it is possible to lower the footboard main body to a desired height. Because the respective stays are expanded and contracted in the lifting and lowering, it is possible to horizontally support the footboard main body in a stable attitude without moving a back-and-forth space between upper ends of the respective stays. As a result, the footboard can be used safely and stably.

In the footboard of the invention, because the attachment members for attaching the footboard to the floor face or a vicinity of the floor face of the portion for getting on and off of the step portion also function as covers in which the left and right advancing/receding members and the left and right lifting/lowering stays are respectively accommodated in a folded state of the footboard main body, it is possible to accommodate the advancing/receding members and the lifting/lowering stays on the left and right of the footboard in the attachment members to keep the members and stays out of the way when the footboard is not used. In other words, because the entire footboard is positioned in a thin and substantially flat state inside the door for getting on and off of the step portion when the footboard is not used, it is possible to keep the footboard out of the way of feet when a person gets on and off, to ensure safety of the person getting on and off, and to prevent defilement of the beauty of the step portion and a periphery of the step portion. A person who can get on and off without drawing out the footboard main body can get on and off by placing his/her feet on the footboard main body collapsed on a floor of the step portion.

What is claimed is:

1. A footboard for making it easy for a person to get on and off a step portion and comprising:

an attachment member for attaching said footboard to a floor face or a vicinity of said floor face of a portion for getting on and off of said step portion;

left and right advancing/receding members supported by said attachment member to advance and recede in a back-and-forth direction;

left and right lifting/lowering stays respectively mounted to said left and right advancing/receding members;

a footboard main body supported horizontally or substantially horizontally by the left and right lifting/lowering stays;

an operating member provided to said footboard main body and formed of a grip or a handle with which advancing/receding and lifting/lowering operations are carried out; and wherein each of said left and right lifting/lowering stays respectively mounted to said left and right advancing/receding members is formed of a link body formed by crossing two stays in an X shape in a side view and fixing a portion of intersection for pivoting by a pin.

2. The footboard according to claim 1, wherein said left and right advancing/receding members for advancing/receding in said back-and-forth direction are formed of a pair of left and right slide rails.

3. The footboard according to claim 1, wherein said left two and right two stays are respectively formed of slide rails.

4. The footboard according to claim 1, wherein said attachment member for attaching said footboard to said floor face or a vicinity of said floor face of said portion for getting on and off of said step portion also functions as a cover in which said left and right advancing/receding members and said left and right lifting/lowering stays are accommodated when said footboard main body is in an accommodated state.

5. The footboard according to claim 1, wherein said step portion is a step portion of an automobile, a staircase of a house, or a vestibule.

6. The footboard according to claim 2, wherein said attachment member for attaching said footboard to said floor face or a vicinity of said floor face of said portion for getting on and off of said step portion also functions as a cover in which said left and right advancing/receding members and said left and right lifting/lowering stays are accommodated when said footboard main body is in an accommodated state.

7. The footboard according to claim 2, wherein said step portion is a step portion of an automobile, a staircase of a house, or a vestibule.

8. The footboard according to claim 3, wherein said attachment member for attaching said footboard to said floor face or a vicinity of said floor face of said portion for getting on and off of said step portion also functions as a cover in which said left and right advancing/receding members and said left and right lifting/lowering stays are accommodated when said footboard main body is in an accommodated state.

9. The footboard according to claim 3, wherein said step portion is a step portion of an automobile, a staircase of a house, or a vestibule.

10. The footboard according to claim 4, wherein said step portion is a step portion of an automobile, a staircase of a house, or a vestibule.

* * * * *